W. W. BOLLS.
BEAD THREADER.
APPLICATION FILED APR. 2, 1919. RENEWED OCT. 27, 1921.
1,417,713.
Patented May 30, 1922.
2 SHEETS—SHEET 2.
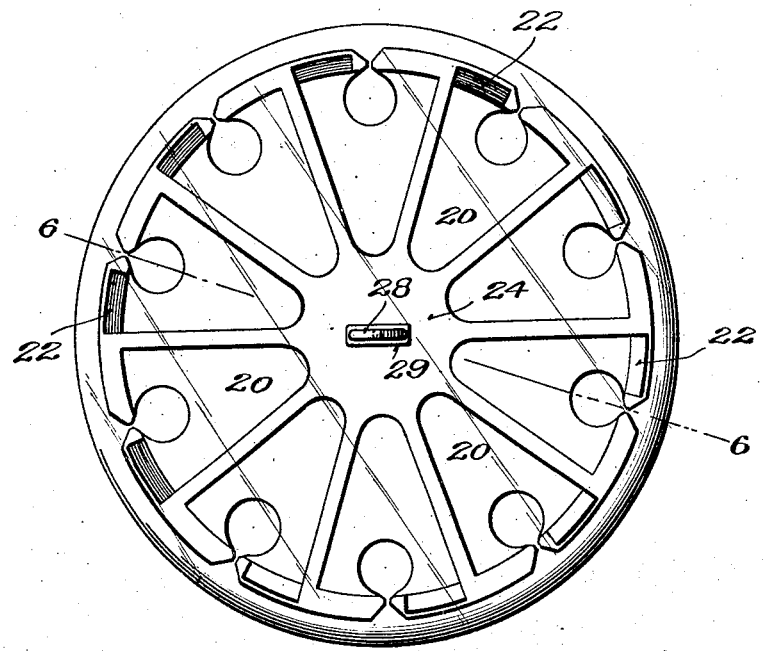
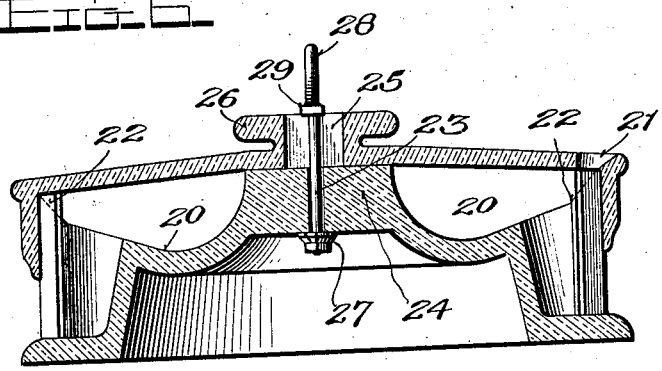

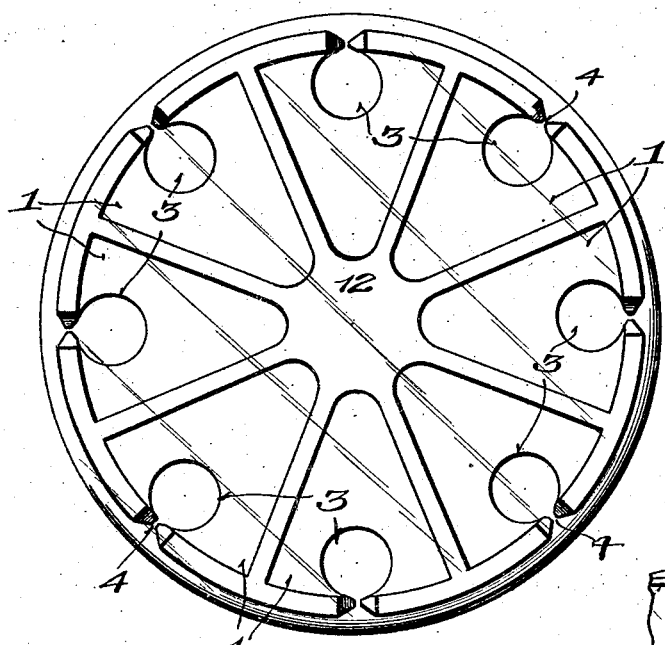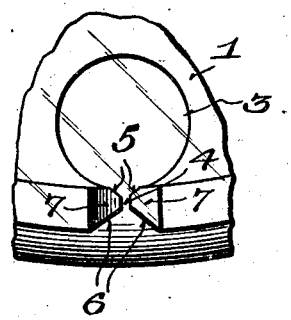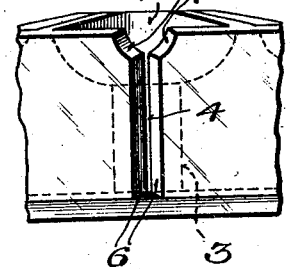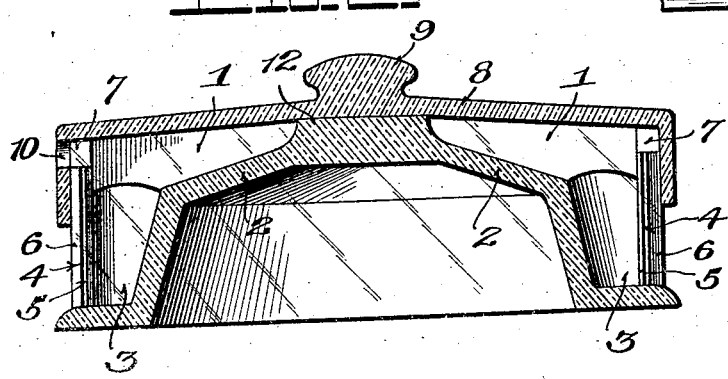

UNITED STATES PATENT OFFICE.

WILLIAM W. BOLLS, OF WASHINGTON, DISTRICT OF COLUMBIA.

BEAD THREADER.

1,417,713.  Specification of Letters Patent.  Patented May 30, 1922.

Application filed April 2, 1919, Serial No. 287,095. Renewed October 27, 1921. Serial No. 510,946.

*To all whom it may concern:*

Be it known that I, WILLIAM W. BOLLS, a citizen of the United States, residing at Washington, in the District of Columbia, have invented certain new and useful Improvements in Bead Threaders, of which the following is a specification.

This invention relates to certain new and useful improvements in bead threaders and the primary object thereof is to provide a container which will confine the beads so as to enable same to be expeditiously threaded, and to also provide means whereby the beads may be separately removed from each or all of the container compartments without mixing the beads with those contained in other compartments.

Further and other objects will be later herein set forth and manifested in the course of the following specification.

In the drawings:

Fig. 1, is a top plan view of the container, the cover being omitted;

Fig. 2, is a central longitudinal sectional view of Fig. 1;

Fig. 3, is a fragmentary front elevation of the container; and

Fig. 4, is an enlarged fragmentary top plan view of the container;

Fig. 5, is a view similar to Fig. 1, of another form of the invention; and

Fig. 6, is a section on line 6—6 of Fig. 5.

In proceeding in accordance with the present invention a container is employed, preferably formed of glass, and divided into a series of compartments 1, the bottoms 2, of which latter incline downwardly toward the periphery of the container as depicted in Fig. 2. Each compartment terminates in a well 3, the latter being relatively deep and of small diameter, the purpose of which formation of the wells is to confine the beads in close relation so as to cause same to somewhat pack within the wells and be confined within a small area to thus facilitate threading. The peripheral wall of the container is formed with vertical slots 4, one leading into each well, the walls defining the slots having their edges beveled at 5, 5, and 6, 6, so that the flared or beveled edges 5, will form a pocket to receive a line of beads, while the beveled edges 6, 6, will facilitate movement of and guide the needle through the slot without binding of the needle.

The top edge of the peripheral wall of the container is formed with cut-outs 7, leading downwardly into the slots 4, and functioning in a dual manner, namely to not only center and facilitate introduction of the needle into the slot 4, but to also provide an egress for the beads when it is desired to empty same out of the well and container, as will now be described.

A cover 8, is formed with a hand grip or knob 9, and has a depending rim, the latter formed with a single opening 10, the top being freely rotatable relative to the container. By selectively bringing the opening 10, into register with the cut-out of any desired well from which the beads are to be emptied, the container may be then tilted so that the beads will gravitate out of the well and container by passing through the cut-out 7 and opening 10. In this manner the wells and container compartments may be successively emptied or any one or more emptied by mere turning of the cover and subsequent tilting of the container.

For the purpose of preventing the beads during emptying of the pockets or compartments from leaving the same except through the parts 7 and 10, the cover and rim are made to closely fit the container as shown in Fig. 2.

In Fig. 5, as well as Fig. 6, another form of the invention is illustrated. In this form, the bottoms of the compartments, are as shown at 20, concaved so as to increase the bead holding capacity thereof, and instead of pouring the beads out of the compartments through the rim of the cover, the latter has an opening 21, in its top which latter is brought to register with the desired compartment from which the beads are to be emptied. The top edge of the peripheral wall of the container is beveled at 22, so that the beads will thus be easily poured out of the pockets or compartments, upon bringing the opening 21, into register with the beveled portions 22.

Also, for the purpose of holding the top in latched relation to the container, a rod 23 is turnably mounted in the central pillar 24, of the container and passes through an elongated slot 25, formed in the cover and the knob 26 thereof, the rod having a spring device, such as a washer 27, attached to its lower end, and having a hand grip 28, formed on its upper end, the rod carrying a latch proper 29, which in one position is receivable through slot 25, and in a second position extends across the slot, as shown in Fig. 6, so as to thereby prevent separating movement between the cover and container. The spring device 27, holds the rod under slight pressure, so as to prevent accidental movement thereof when latched. By turning of the rod to cause the latch to register with slot 25, it will be manifest that the cover can be removed at will.

In all forms of the invention it will be seen that a series of radial compartments or bead containing pockets are provided, each emanating from a central pillar which latter provides an inner end wall for each compartment, or in other words is common to each compartment.

The device being formed of glass enables ready inspection of the beads both from the sides as well as top of the structure. It will also be evident that with use of the inclined or beveled parts 22, the beads, upon pouring thereof from the compartment, will readily gravitate back into the latter should one or more remain in or on the part 22, following emptying of the compartment.

The respective compartments and wells are filled with beads of varying colors, and in use the top is removed and the needle passed through the slot 4 of a desired compartment and moved forward to pick up one or more of the beads. Usually a single thrust of the needle results in a bead being picked up; if not a further thrust is necessary. If more than one bead is picked up, the other or others may be removed by engaging the latter with an edge of the wall defining the compartment and moving the needle outwardly.

What is claimed is:

1. In a bead threader, a container having a bead holding compartment and a bead holding well at the outer end thereof communicating therewith and extending below the bottom of the compartment so that beads placed in the compartment will enter the well and be held therein under pressure from the beads in the compartment and a wall forming the outer end of the well and the outer end of the compartment and having a needle receiving slot so that a needle may be thrust laterally across the slot to enter the well.

2. In a bead threader, a container having a bead holding compartment and a bead holding well at the outer end thereof communicating therewith and extending below the bottom of the compartment so that beads placed in the compartment will enter the well and be held therein under pressure from the beads in the compartment and a wall forming the outer end of the well and the outer end of the compartment and having a needle receiving slot which is common to both the compartment and well, and a glass cover having a rim which extends downwardly over the top part of the slot so as to have its bottom edge effect guidance of the needle into the well.

3. In a bead threader, a container having a compartment, and a well at the outer end of the compartment communicating therewith and extending below the bottom of the compartment, said well having a vertical needle slot and the inner and outer edges of the slot in a well thereof being beveled.

4. In a bead threader, a container having a peripheral wall, a central common pillar and a series of compartments radiating therefrom, each compartment having a vertical needle slot and the pillar being formed to slope towards the slots, and a cover seated at its center on the pillar and at its outer portion on the top of the peripheral wall, said wells being smaller than the compartments and adapted to receive beads which latter are held under pressure from the beads in the compartments.

5. In a bead threader, a container having a series of compartments, a cover rotatably mounted on the container and having a pouring opening, said opening being adapted to communicate with a selected one of the compartments, and means to latch the cover on the container and to allow of removal of the cover in one position of the latching means.

6. In a bead threader, a container having a series of radial compartments, and a sunken well at the outer end of each compartment communicating therewith, a wall of the wells having a needle slot, said wells being smaller than the compartments and adapted to receive beads which latter are held under pressure from the beads in the compartments.

7. In a bead threader, a container having a series of compartments, a cover rotatable on the container and having an opening formed so as to register with a selected one of the compartments, said cover having a slot therein, and means borne by the container and embodying an element which in one position is movable through the slot so as to allow the cover to be removed from the container and in a second position extends across the slot and prevents removal of the cover.

8. In a bead threader, a container having a series of compartments, a cover rotatable on the container, and having an opening for selective register with one of the compartments at a time to allow the beads to be emptied out of the selected compartment, and rotatable means to mount said cover so as to allow the latter to rotate on the container and to also allow the cover to be removed from the container upon rotation of said mounting means to a predetermined position.

9. In a bead threader, a container having a compartment and a bead receiving well at the outer end of the compartment communicating therewith and extending below the bottom of the compartment thereof and formed with a needle slot in a wall, the well extending below the bottom of the compartment and being formed so as to hold the beads in packed relation and under pressure from the beads in the compartment.

In testimony whereof I affix my signature.

WILLIAM W. BOLLS.